UNITED STATES PATENT OFFICE.

CHARLES G. AM ENDE, OF HOBOKEN, NEW JERSEY.

IMPROVEMENT IN COMPOSITION OF BORATED COTTON FOR PRESERVING.

Specification forming part of Letters Patent No. 181,024, dated August 15, 1876; application filed April 17, 1876.

*To all whom it may concern:*

Be it known that I, CHARLES G. AM ENDE, of Hoboken, Hudson county, New Jersey, have invented new and Improved Borated Cotton, of which the following is a specification:

This invention has for its objects to combine the various advantages of cotton-fiber with those possessed by boracic acid and glycerine for preserving animal and vegetable matter from decay.

Heretofore boracic acid has been used as a preservative agent in a fluid state, and also as a powder. In use, the matter to be preserved had to be immersed in the solution of boracic acid, or completely covered with the powder. In either case, a very large quantity of boracic acid was used.

My present invention, which consists in saturating cotton-fiber with boracic acid and glycerine in a manner hereinafter described, enables me to apply a very small proportion of boracic acid and glycerine to the cotton-fiber with fully as good an effect as though the matter to be preserved were entirely embedded in large quantities of the solution or powder. It enables me, at the same time, to utilize the germ-filtering properties of the cotton, and its elasticity as a superior material for packing or covering delicate tissue.

I produce my improved borated cotton as follows: I first prepare a solution of boracic acid in the usual manner, and add thereto a small proportion of glycerine. For the preservation of tender substances, such as veal, I may also add from ten to forty per cent. of soda or potash, never sufficient, however, to reach neutrality. The cotton, either in bulk or wadding, is next immersed in the solution until well impregnated therewith, and then pressed, to discharge all surplus solution, or so much thereof as may be required. The cotton is then dried and ready for use.

When applied to the material to be preserved, either as a covering or as a wrapping or packing, the cotton will constitute a filter for keeping germs of putrefaction from passing through, and the boracic acid absorbed by the cotton will, at the same time, preserve the surfaces from decay, and counteract all injurious influences of germs, or other elements of destruction, already in contact with such surfaces.

The glycerine is added to increase the preserving power of the borated cotton. It renders the cotton slightly hygroscopic, thus aiding in the diffusion of the acid and in the preservative effect of the prepared cotton.

I have found that the impregnated fiber shows, even under a good microscope, no difference from a fiber not impregnated with boracic acid, and that, therefore, although a very thin film of acid may adhere to the exterior surface of the fiber, the main proportion of the acid is absorbed by and diffused within the fibers. In consequence, the acid can, in use, be but gradually released from the fiber, and will thus produce a constant and lasting effect.

I claim—

The borated cotton, being cotton fiber which is saturated with boracic acid and glycerine, substantially as herein shown and described.

The foregoing description of my invention signed by me this 5th day of April, 1876.

CHAS. G. AM ENDE.

Witnesses:
 ERNEST C. WEBB,
 A. MORAGA.